United States Patent [19]

Robb

[11] Patent Number: 4,950,041

[45] Date of Patent: Aug. 21, 1990

[54] LENS SYSTEMS COMPRISING PLASTIC AND LIQUID LENS ELEMENTS

[75] Inventor: Paul N. Robb, Sunnyvale, Calif.

[73] Assignee: Lockheed Missiles & Space Company, Inc, Sunnyvale, Calif.

[21] Appl. No.: 379,386

[22] Filed: Jul. 13, 1989

[51] Int. Cl.⁵ .............................................. G02B 1/06
[52] U.S. Cl. .................................... 350/418; 350/480
[58] Field of Search ................ 350/418, 419, 479, 480

[56] References Cited

FOREIGN PATENT DOCUMENTS 490381  8/1938  United Kingdom ................ 350/418

Primary Examiner—Paul M. Dzierzynski
Attorney, Agent, or Firm—John J. Morrissey

[57] ABSTRACT

Lens triplets (two achromats and a apochromat) are disclosed that are well-corrected for chromatic aberration and for spherochromatism. Each triplet comprises two identical acrylic lens elements and a liquid lens element.

10 Claims, 9 Drawing Sheets

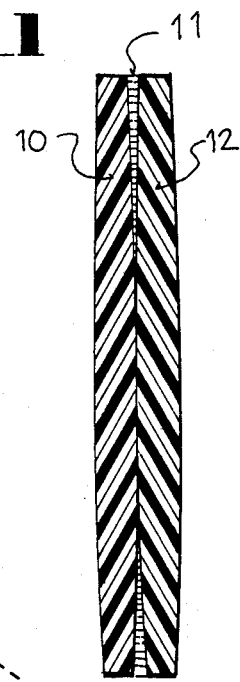
FIG_1
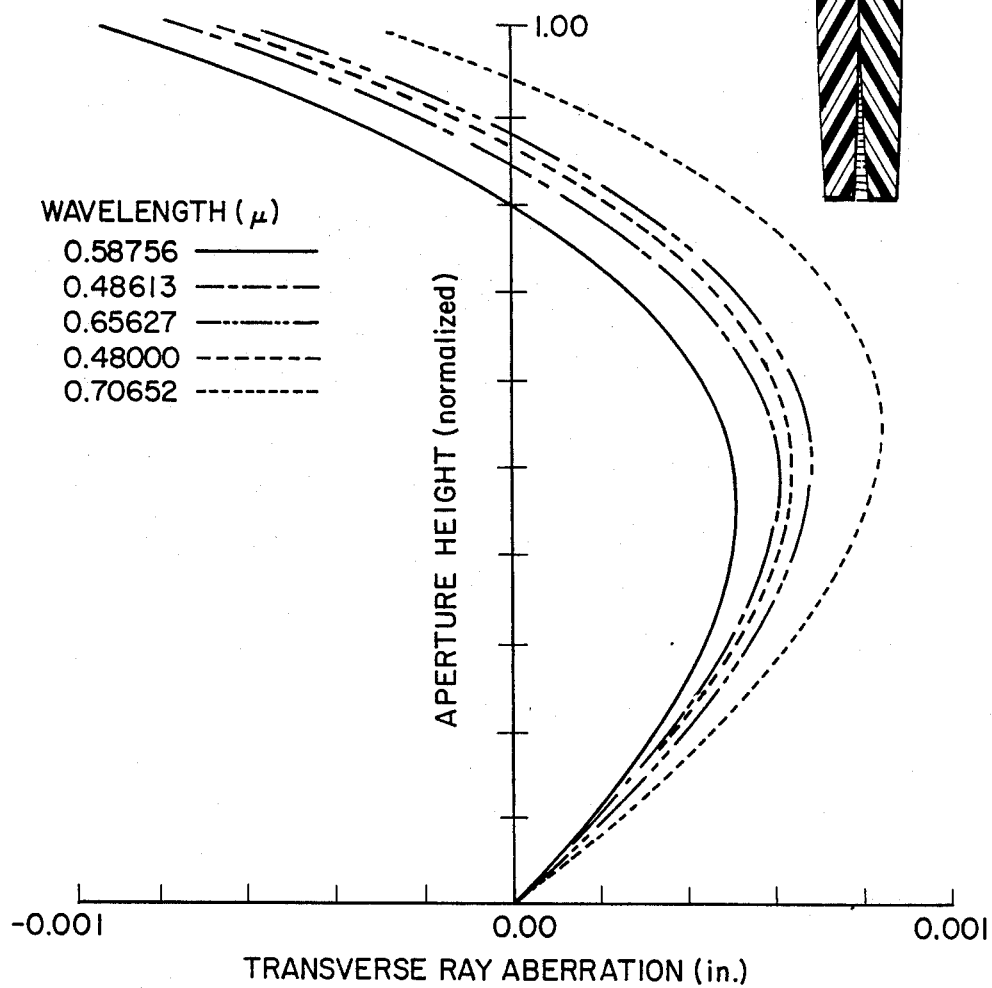
FIG_2

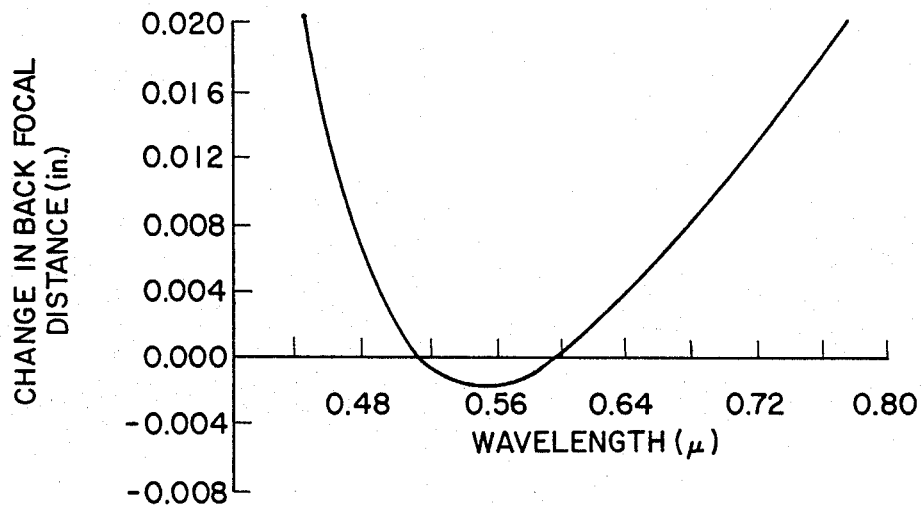
FIG_3
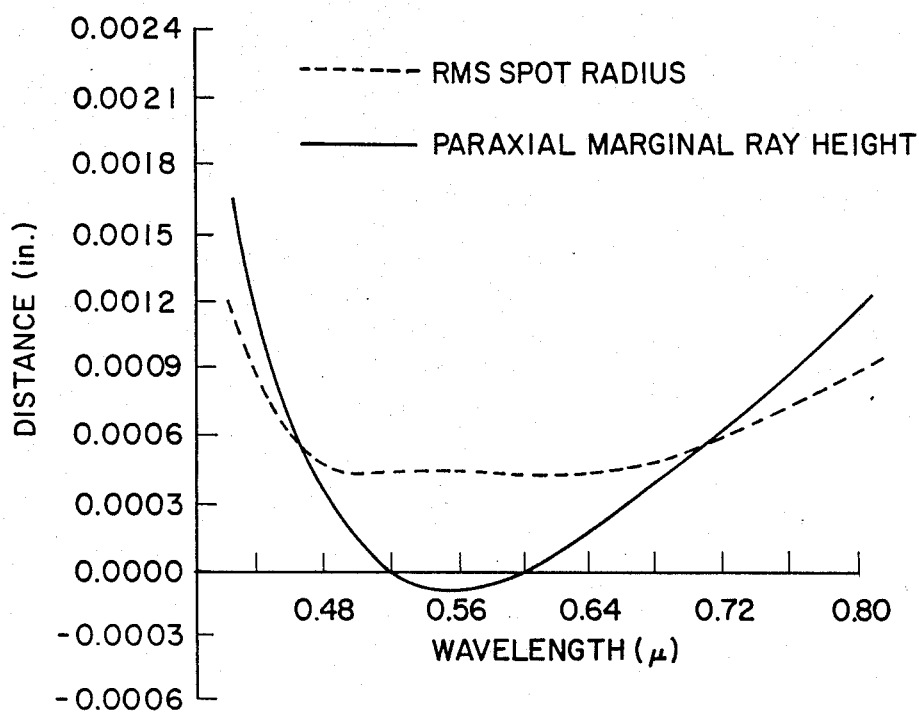
FIG_4

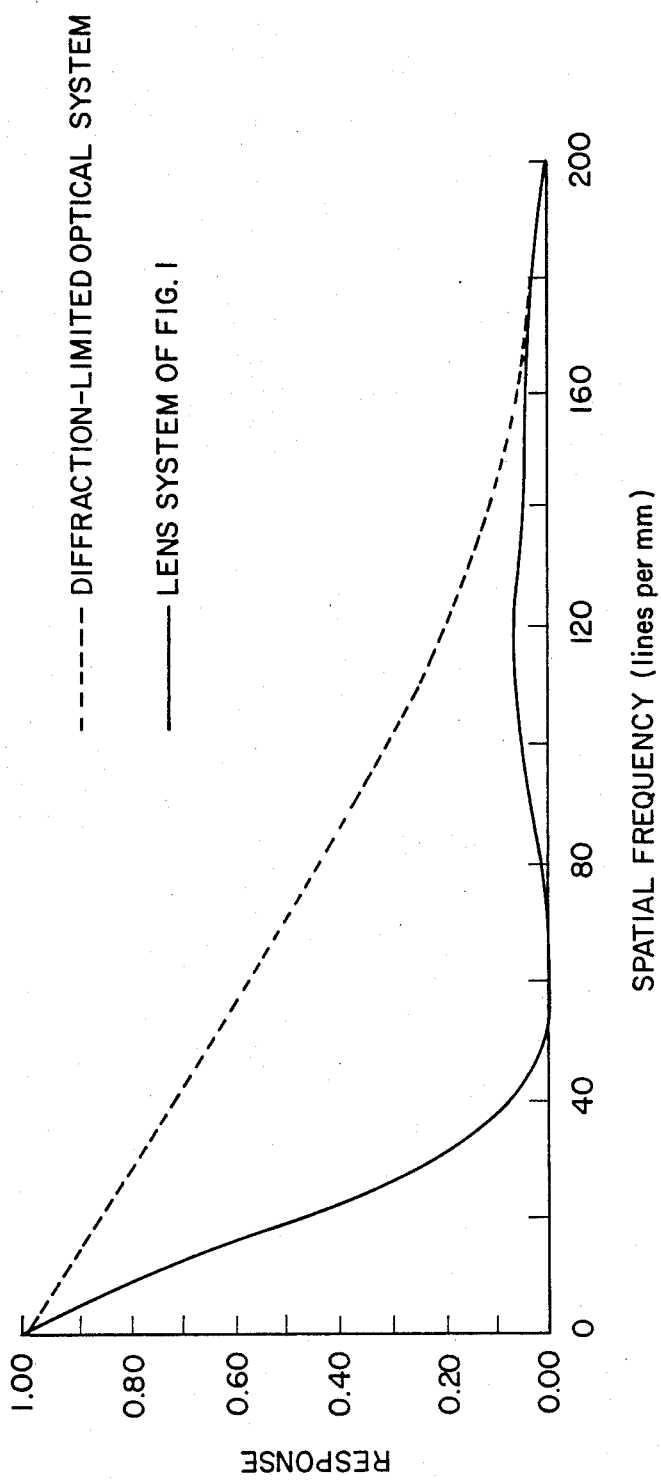

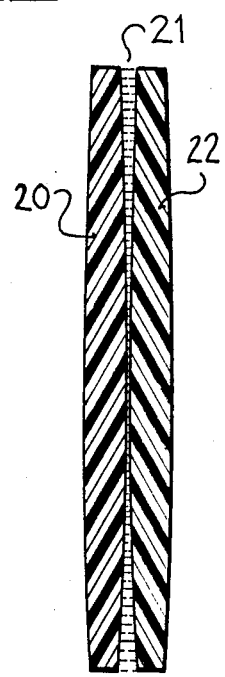
FIG_6
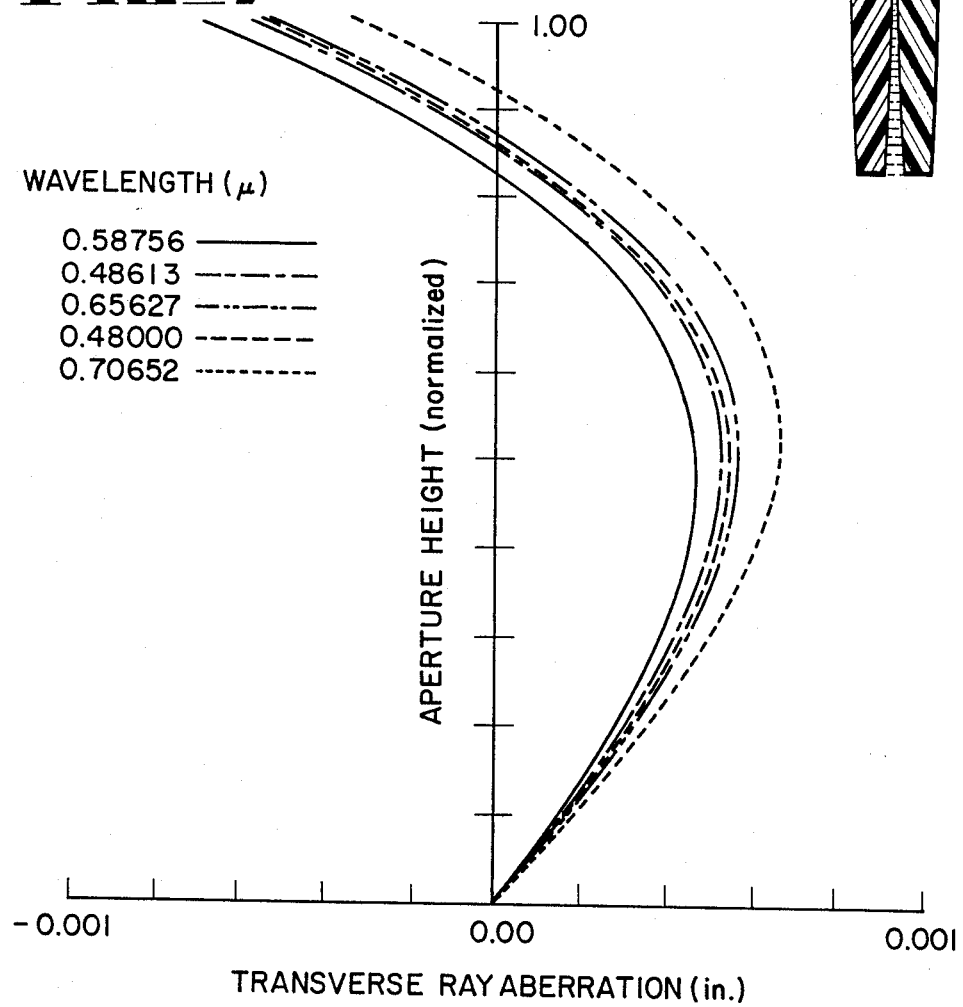
FIG_7

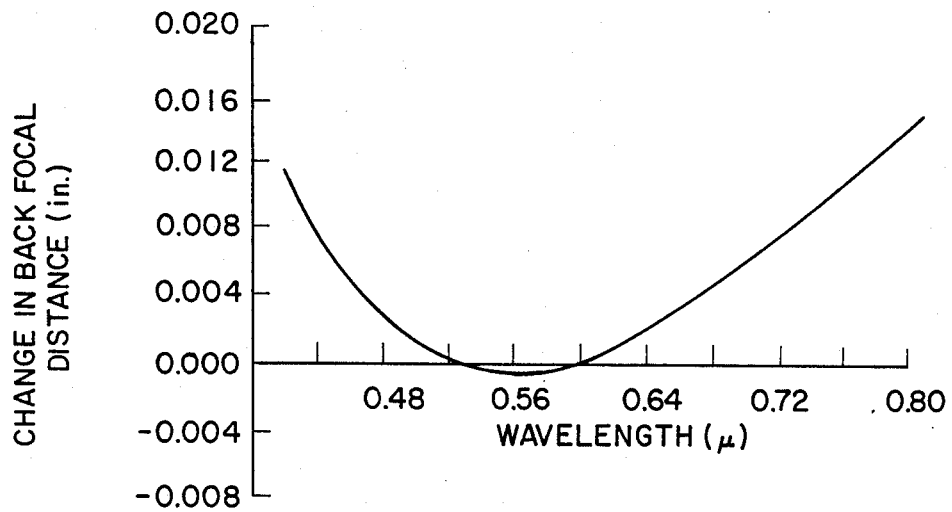
FIG_8
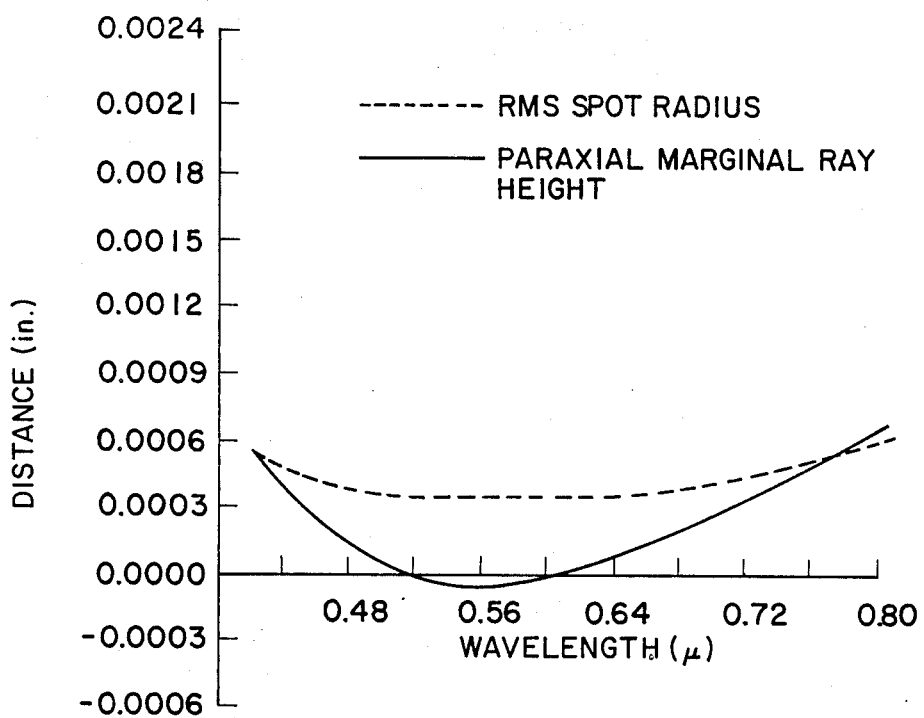
FIG_9

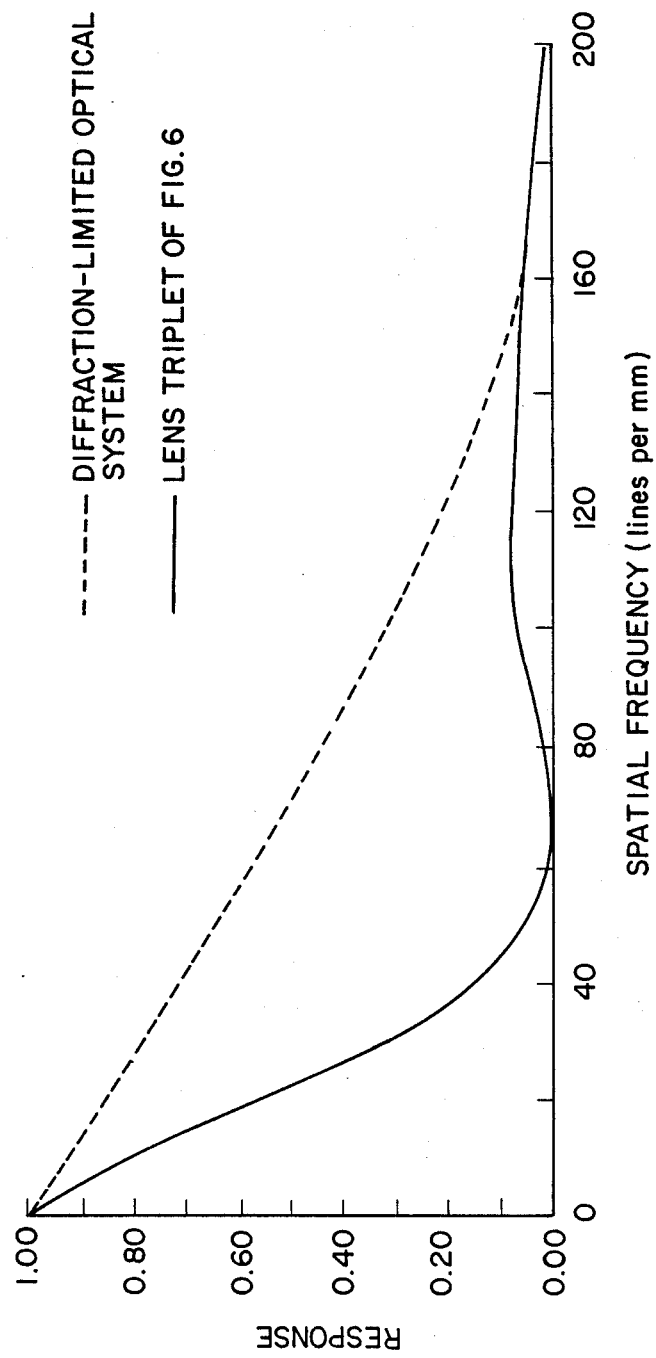

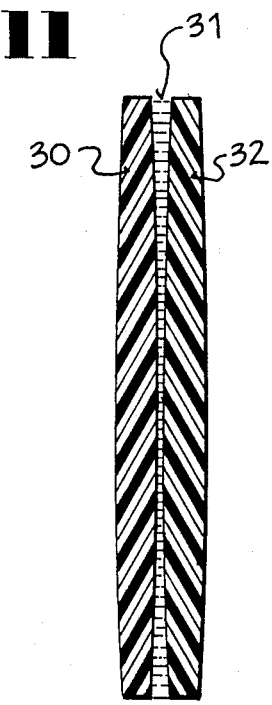
FIG_11
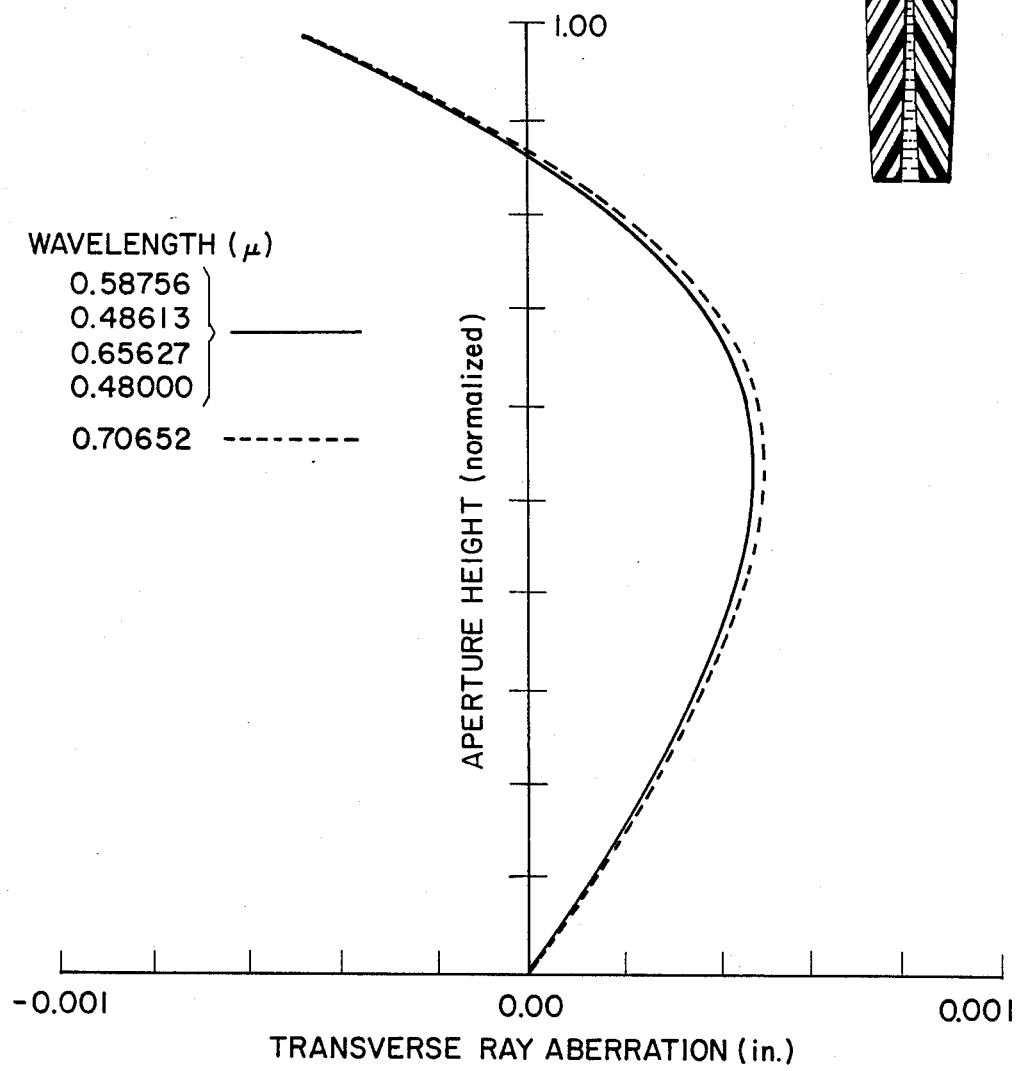
FIG_12

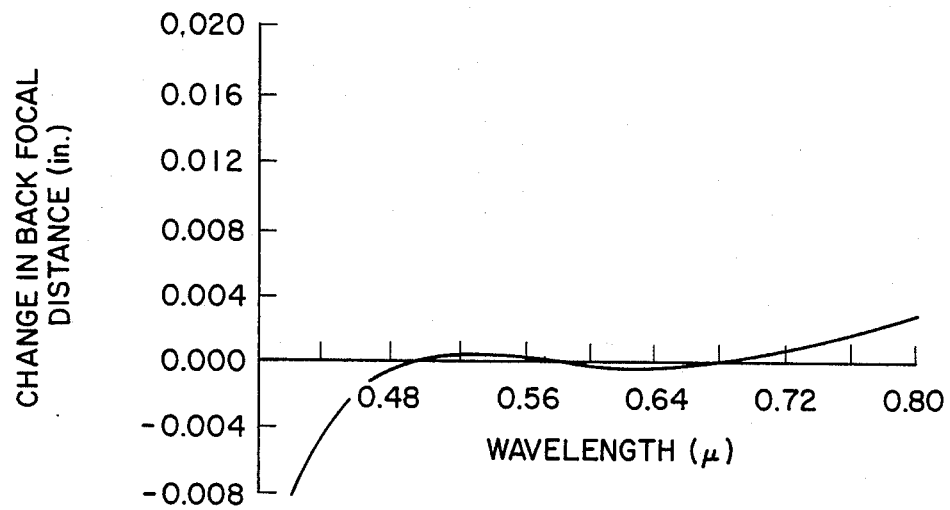
FIG_13
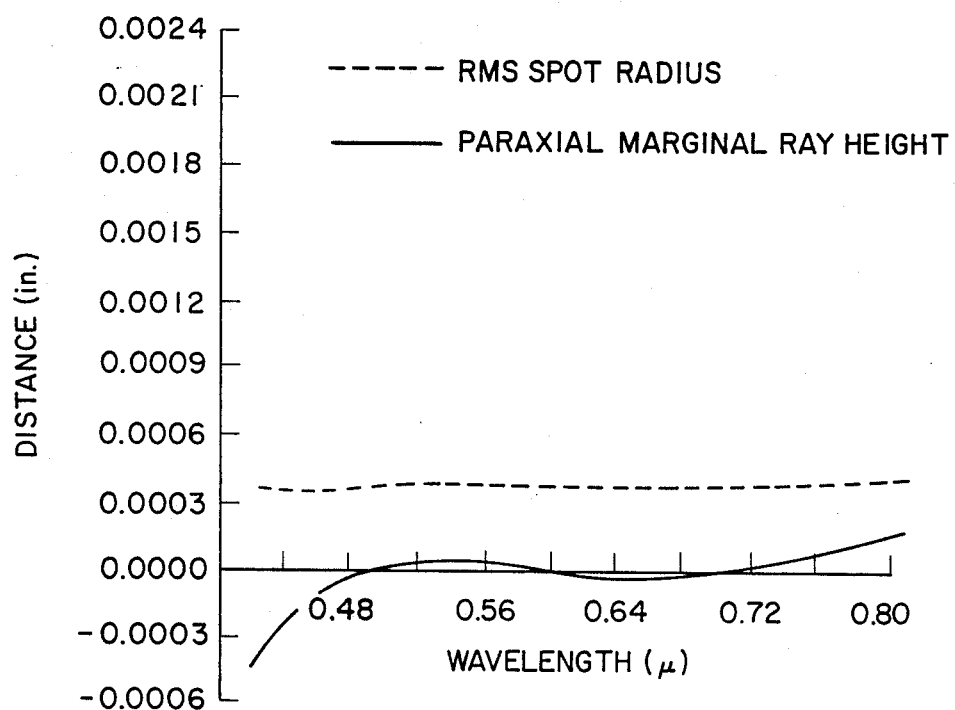
FIG_14

LENS SYSTEMS COMPRISING PLASTIC AND LIQUID LENS ELEMENTS

TECHNICAL FIELD

This invention relates generally to lens systems comprising plastic and liquid lens elements, and more particularly to lens systems comprising acrylic and liquid lens elements that are well-corrected for chromatic aberration and spherochromatism.

BACKGROUND OF THE INVENTION

In co-pending U.S. patent application Ser. No. 419,705 filed on Sept. 20, 1982, a technique was disclosed that enables an optical designer to select compatible optical materials for the refractive elements of an optical system that is to be color-corrected at a specified number of wavelengths. A technique disclosed in co-pending U.S. patent application Ser. No. 260,106 filed on Oct. 20, 1988 enables the designer of a lens system that is to be color-corrected at a specified number of wavelengths to include one or more liquid lens elements among the lens elements of the system.

In co-pending U.S. patent application Ser. No. 282,665 filed on Dec. 12, 1988, examples were disclosed of apochromatic lens triplets of a type in which a liquid lens element is contained between two geometrically identical glass lens elements facing in opposite directions. In co-pending U.S. patent application Ser. No. 345,793 filed on May 1, 1989, examples were disclosed of apochromatic lens systems of a type in which a number of identical glass lens elements and a liquid lens element are used to achieve high performance as indicated by a change in focus of less than one-quarter wavelength over the visible spectrum.

Plastic lens elements are generally much lighter than glass lens elements of similar dimensions. Consequently, plastic lens elements are decidedly preferable to glass lens elements in applications requiring low weight (e.g., space-based optical systems). Furthermore, there are advantages with respect to manufacturing operations in using plastic lens elements due to the fact that plastic lens elements can be made by injection molding without requiring optical grinding and polishing. Techniques for producing plastic lens elements by injection molding to meet specified optical prescriptions are well known.

SUMMARY OF THE INVENTION

It is an object of the present invention to provide a lens system comprising plastic and liquid lens elements, which lens system is well-corrected for chromatic aberration and spherochromatism.

In accordance with the present invention, three examples of lens triplets are disclosed in which the lens elements of each triplet consist of a pair of identical acrylic lens elements and a liquid lens element contained therebetween.

DESCRIPTION OF THE DRAWING

FIG. 1 is a profile drawing of a first embodiment of a lens triplet according to the present invention.

FIG. 2 is a plot of transverse ray aberration versus aperture height at five different wavelengths for the lens triplet of FIG. 1.

FIG. 3 is a plot of change in back focal distance versus wavelength for the lens triplet of FIG. 1.

FIG. 4 is a combined plot of paraxial marginal ray height versus wavelength and root-mean-square (rms) spot radius versus wavelength for the lens triplet of FIG. 1.

FIG. 5 is a combined plot of the polychromatic modulation transfer function for on-axis rays calculated at the wavelengths indicated in FIG. 2 for the lens triplet of FIG. 1, and of the polychromatic modulation transfer function for on-axis rays calculated at the same wavelengths for an aberration-free optical system having the same aperture diameter and focal ratio as the lens triplet of FIG. 1.

FIG. 6 is a profile drawing of a second embodiment of a lens triplet according to the present invention.

FIG. 7 is a plot of transverse ray aberration versus aperture height at five different wavelengths for the lens triplet of FIG. 6.

FIG. 8 is a plot of change in back focal distance versus wavelength for the lens triplet of FIG. 6.

FIG. 9 is a combined plot of paraxial marginal ray height versus wavelength and root-mean-square (rms) spot radius versus wavelength for the lens triplet of FIG. 6.

FIG. 10 is a combined plot of the polychromatic modulation transfer function for on-axis rays calculated at the wavelengths indicated in FIG. 7 for the lens triplet of FIG. 6, and of the polychromatic modulation transfer function for on-axis rays calculated at the same wavelengths for an aberration-free optical system having the same aperture diameter and focal ratio as the lens triplet of FIG. 6.

FIG. 11 is a profile drawing of a third embodiment of a lens triplet according to the present invention.

FIG. 12 is a plot of transverse ray aberration versus aperture height at five different wavelengths for the lens triplet of FIG. 11.

FIG. 13 is a plot of change in back focal distance versus wavelength for the lens triplet of FIG. 11.

FIG. 14 is a combined plot of paraxial marginal ray height versus wavelength and root-mean-square (rms) spot radius versus wavelength for the lens triplet of FIG. 11.

BEST MODE OF CARRYING OUT THE INVENTION

Figure 15:
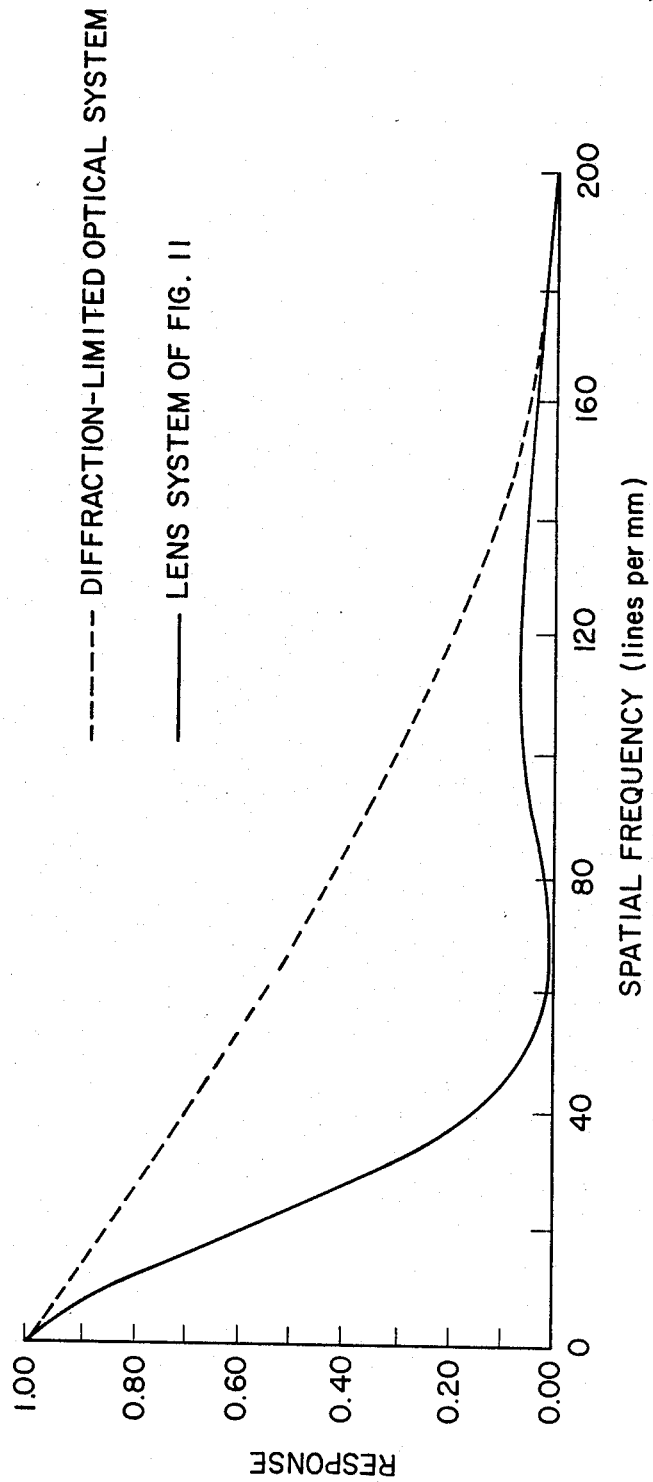
FIG. 15 is a combined plot of the polychromatic modulation transfer function for on-axis rays calculated at the wavelengths indicated in FIG. 12 for the lens triplet of FIG. 11, and of the polychromatic modulation transfer function for on-axis rays calculated at the same wavelengths for an aberration-free optical system having the same aperture diameter and focal ratio as the lens triplet of FIG. 11.

A first embodiment of a lens system according to the present invention, as illustrated in FIG. 1, is a triplet comprising an acrylic lens element 10, a liquid lens element 11, and an acrylic lens element 12, which are disposed coaxially with respect to each other along an optic axis, and which are secured in a mounting device appropriate for the particular application. The lens triplet illustrated in FIG. 1 can be used as, e.g., a photographic objective. A technique for containing the liquid lens element 11 between the acrylic lens elements 10 and 12 is disclosed in the aforementioned U.S. patent application Ser. No. 260,106.

The acrylic lens elements 10 and 12 are substantially identical to each other in chemical composition and in geometry. The liquid lens element 11 consists of a relatively inexpensive optical liquid marketed by R. L.

Cargille Laboratories of Cedar Grove, N.J., and is contained between facing surfaces of the acrylic lens elements 10 and 12. The particular Cargille liquid used for the liquid lens element 11 is uniquely identified according to the U.S. Mil Spec system by the code number 710209. The designation "710209" specifies a particular liquid whose index of refraction at the wavelength of the sodium D spectral line (i.e., 0.5893 micron) has the value 1.710 to the third decimal place, and whose Abbe number has the value 20.9 to the first decimal place.

The lens triplet shown in FIG. 1 has an optical prescription specified in tabular format for a 10-inch focal length and an f/10 focal ratio as follows:

TABLE I

| Surface No. | Radius (inches) | Thickness (inches) | $N_d$ | $V_d$ | Material |
|---|---|---|---|---|---|
| 1 | 8.36182 | 0.07106 | 1.49176 | 57.46 | acrylic |
| 2 | −25.11101 | 0.00142 | 1.71035 | 20.95 | 710209 |
| 3 | 25.11101 | 0.07106 | 1.49176 | 57.46 | acrylic |
| 4 | −8.36182 | 9.92095 | | | |
| 5 | (image plane) | | | | | where the surfaces of the lens elements are numbered consecutively from left to right in accordance with optical design convention. Surface No. 2 is common to the acrylic lens element 10 and to the liquid lens element 11, and surface No. 3 is common to the liquid lens element 11 and to the acrylic lens element 12. Both surfaces of each lens element are spherical.

The "radius" listed for each surface is the radius of curvature of the surface (expressed in inches) at the optic axis. The radius of curvature of a surface is said to be positive if the center of curvature of the surface lies to the right of the surface, and negative if the center of curvature of the surface lies to the left of the surface. The diameter of each lens element is one inch, and the aperture stop for the system is located at surface No. 1.

The "thickness" listed for a given surface in Table I is the thickness of the lens element bounded on the left by the given surface, where the thickness of each lens element is measured in inches along the optic axis of the system.

The column heading $N_d$ in Table I refers to the refractive index of the lens element bounded on the left by the indicated surface for the wavelength of the sodium d spectral line (i.e., for a base wavelength of 0.58756 micron). The column heading $V_d$ refers to the Abbe number for the lens element bounded on the left by the indicated surface at the same base wavelength. The "material" listed for each surface in Table I refers to the type of optical material from which the lens element bounded on the left by the indicated surface is made.

The Cargille liquid listed in Table I is identified by the code designation "710209", which uniquely specifies the particular liquid in terms of its index of refraction at the wavelength of the sodium D line. However, as a point of clarification, the values for refractive index listed in Table I for the Cargille 710209 liquid as well as for acrylic are the values at the wavelength of the sodium d line.

The refractive index of each of the optical materials from which the lens elements of the triplet of FIG. 1 are made varies with wavelength. To evaluate the performance of the lens triplet of FIG. 1 at a number of different wavelengths, five wavelengths within the visible region of the electromagnetic spectrum were selected at which the refractive indices of the optical materials have the following values:

TABLE II

| Material | Index of Refraction | | | | |
|---|---|---|---|---|---|
| | $N_1$ | $N_2$ | $N_3$ | $N_4$ | $N_5$ |
| acrylic | 1.49176 | 1.49776 | 1.48920 | 1.49826 | 1.48778 |
| 710209 | 1.71035 | 1.73486 | 1.70096 | 1.73703 | 1.69606 | where $N_1$ is the refractive index at the base wavelength of 0.58756 micron, and $N_2$, $N_3$, $N_4$ and $N_5$ are the refractive indices at specified wavelengths on either side of the base wavelength. Thus, $N_2$ is the refractive index at 0.48613 micron, $N_3$ is the refractive index at 0.65627 micron, $N_4$ is the refractive index at 0.48000 micron and $N_5$ is the refractive index at 0.70652 micron.

A graphical indication of performance of a lens system is provided by a plot of transverse ray aberration versus aperture height. Plots of transverse ray aberration versus aperture height are given in FIG. 2 for each of the five wavelengths indicated in Table II. From the shapes of the five plots shown in FIG. 2, it is apparent that performance is limited by a combination of focal shift and third-order spherical aberration.

The back focal distance of a lens system for a particular wavelength is defined as the distance along the optic axis of the system between the focal surface for that particular wavelength and the lens surface closest to that focal surface. The back focal distance for those wavelengths at which color correction has been achieved (i.e., for those wavelengths at which paraxial marginal rays passing through the system are brought to a common focus at the focal surface) can be considered as a "baseline" back focal distance for the system. The change in back focal distance from the "baseline" back focal distance as a function of wavelength provides an indication of the variation of axial chromatic aberration with respect to wavelength for the system.

FIG. 3 is a plot of change in back focal distance versus wavelength at the focal plane of the lens triplet illustrated in FIG. 1. The curve plotted in FIG. 3 indicates the chromatic variation in focal position along the optic axis, and provides a measure of axial chromatic aberration of the lens triplet of FIG. 1. The two crossings of the horizontal axis by the curve plotted in FIG. 3 indicate that the lens triplet illustrated in FIG. 1 is color-corrected at two wavelengths, and is therefore an achromat.

In FIG. 4, paraxial marginal ray height and root-mean-square (rms) spot radius are plotted as functions of wavelength for the lens triplet of FIG. 1. The variation of paraxial marginal ray height with respect to wavelength on the image plane provides an indication of the extent to which the system is corrected for axial chromatic aberration. The curve for paraxial marginal ray height versus wavelength shown in FIG. 4 crosses the horizontal axis at two places, and thus corroborates the showing in FIG. 3 that the lens triplet of FIG. 1 is an achromat.

The curve for rms spot radius versus wavelength in FIG. 4 indicates that the rms spot radius is nearly constant over the wavelength range from about 0.46 micron to about 0.70 micron. A detailed analysis shows that spherical aberration and the chromatic variation of spherical aberration, combined with the chromatic variation of focal position, for the lens triplet of FIG. 1 result in a variation of rms spot radius with respect to wavelength that is less than 10% over the range from 0.46 micron to 0.70 micron.

Because of the electromagnetic nature of optical radiation, the performance of an optical system is affected not only by geometrical aberrations (i.e., the monochromatic aberrations, chromatic aberration, and chromatic variations of the monochromatic aberrations) but also by diffraction. In a lens system, diffraction reduces the contrast of a sinusoidal input signal by an amount that varies with the spatial frequency of the input signal. In general, according to the principles of systems engineering, the performance of a system can be indicated by the ratio of the amplitude of the output to the amplitude of the input. This ratio is conventionally expressed as a plot of response versus frequency. In analyzing the performance of a lens system, the "polychromatic modulation transfer function" is defined as the ratio of the modulation of the input signal to the modulation of the output signal. This ratio, plotted as a function of the spatial frequency (measured in lines per millimeter) of the input signal, indicates the performance of the lens system.

In FIG. 5, the polychromatic modulation transfer function (i.e., response versus spatial frequency) for on-axis rays calculated at the five wavelengths listed in Table II is plotted as a solid-line curve for the lens triplet of FIG. 1. Also shown in FIG. 5 is a plot on the same scale of the polychromatic modulation transfer function for on-axis rays calculated at the same five wavelengths for an aberration-free optical system having the same aperture diameter and focal ratio as the lens triplet of FIG. 1. The plot of the polychromatic modulation transfer function for on-axis rays for the aberration-free optical system is shown as a broken-line curve in FIG. 5.

A second embodiment of a lens system according to the present invention, as illustrated in FIG. 6, is a triplet comprising an acrylic lens element 20, a liquid lens element 21, and an acrylic lens element 22, which are disposed coaxially with respect to each other along an optic axis, and which are secured in an appropriate mounting device for use as, e.g., a photographic objective. The optical prescription for the lens triplet shown in FIG. 6 is specified in tabular format for a 10-inch focal length and an f/10 focal ratio as follows:

TABLE III

| Surface No. | Radius (inches) | Thickness (inches) | $N_d$ | $V_d$ | Material |
|---|---|---|---|---|---|
| 1 | 9.55933 | 0.07106 | 1.49176 | 57.46 | acrylic |
| 2 | −6.31572 | 0.00142 | 1.50012 | 35.31 | 499352 |
| 3 | 6.31572 | 0.07106 | 1.49176 | 57.46 | acrylic |
| 4 | −9.55933 | 9.92323 | | | |
| 5 | (image plane) | | | | | where the surfaces of the lens elements are all spherical and are numbered consecutively from left to right along the optic axis; and where the "radius", "thickness", "$N_d$", "$V_d$" and "material" for each of the lens surfaces are listed in accordance with the convention explained above in connection with Table I. The diameter of each lens element is one inch, and the aperture stop for the system is located at surface No. 1.

The Cargille liquid listed in Table III is identified by the code designation "499352", which uniquely specifies the particular liquid in terms of its index of refraction at the wavelength of the sodium D line. However, the values for refractive index listed in Table III for the Cargille 499352 liquid as well as for acrylic are the values at the wavelength of the sodium d line.

The values of refractive index for the optical materials comprising the lens triplet of FIG. 6 at the same five wavelengths used to evaluate the performance of the lens triplet of FIG. 1 are given in tabular format as follows:

TABLE IV

| Material | Index of Refraction | | | | |
|---|---|---|---|---|---|
| | $N_1$ | $N_2$ | $N_3$ | $N_4$ | $N_5$ |
| acrylic | 1.49176 | 1.49776 | 1.48920 | 1.49826 | 1.48778 |
| 499352 | 1.50012 | 1.51015 | 1.49599 | 1.51098 | 1.49374 | where $N_1$ is the refractive index at the base wavelength of 0.58756 micron, and $N_2$, $N_3$, $N_4$ and $N_5$ are the refractive indices at specified wavelengths on either side of the base wavelength. Thus, $N_2$ is the refractive index at 0.48613 micron, $N_3$ is the refractive index at 0.65627 micron, $N_4$ is the refractive index at 0.48000 micron and $N_5$ is the refractive index at 0.70652 micron.

In FIG. 7, a plot of transverse ray aberration versus aperture height for the lens triplet of FIG. 6 is given for each of the five wavelengths indicated in Table IV. From the shapes of the five plots shown in FIG. 7, it is apparent that performance is limited by a combination of focal shift and third-order spherical aberration.

FIG. 8 is a plot of change in back focal distance versus wavelength for the lens triplet shown in FIG. 6. As indicated by the two crossings of the horizontal axis by the curve shown in FIG. 8, the lens triplet of FIG. 6 is achromatic. Compared with the lens triplet of FIG. 1, the lens triplet of FIG. 6 has much reduced secondary spectrum as indicated by the fact that the portion of the curve between the crossing points on the horizontal axis in FIG. 7 is much closer to the horizontal axis than is the corresponding portion of the curve shown in FIG. 2.

In FIG. 9, paraxial marginal ray height and rms spot radius are plotted as functions of wavelength at the image plane for the lens triplet of FIG. 6. The curve for paraxial marginal ray height versus wavelength in FIG. 9 is seen to have the same shape as the curve for change in back focal distance versus wavelength shown in FIG. 8. The curve for rms spot radius versus wavelength in FIG. 9 indicates that the rms spot radius is practically constant over the wavelength range from 0.46 micron to 0.67 micron. A detailed analysis shows that spherical aberration and the chromatic variation of spherical aberration, combined with the chromatic variation of focal position, for the lens triplet of FIG. 6 result in a variation of rms spot radius with respect to wavelength that is less than 2.5% over the range from 0.46 micron to 0.67 micron.

In FIG. 10, the polychromatic modulation transfer function for on-axis rays calculated at the five wavelengths listed in Table IV is plotted as a solid-line curve for the lens triplet of FIG. 6. Also shown in FIG. 10 is a plot on the same scale of the polychromatic modulation transfer function for on-axis rays calculated at the same five wavelengths for an aberration-free optical system having the same aperture diameter and focal ratio as the lens triplet of FIG. 6. The plot for the aberration-free optical system is shown as a broken-line curve in FIG. 10.

A third embodiment of a lens system according to the present invention, as illustrated in FIG. 11, is a triplet comprising an acrylic lens element 30, a liquid lens element 31, and an acrylic lens element 32, which are disposed coaxially with respect to each other along an optic axis, and which are secured in an appropriate mounting device for use as, e.g., a photographic objective. The optical prescription for the lens triplet of FIG. 11 is specified in tabular format for a 10-inch focal length and an f/10 focal ratio as follows:

TABLE V

| Surface No. | Radius (inches) | Thickness (inches) | $N_d$ | $V_d$ | Material |
|---|---|---|---|---|---|
| 1 | 10.78748 | 0.07106 | 1.49176 | 57.46 | acrylic |
| 2 | −4.77688 | 0.00142 | 1.47011 | 8.08 | 470380 |
| 3 | 4.77688 | 0.07106 | 1.49176 | 57.46 | acrylic |
| 4 | −10.78748 | 9.92072 | | | |
| 5 | (image plane) | | | | | where the surfaces of all the lens elements are spherical, and are numbered consecutively from left to right along the optic axis; and where the "radius", "thickness", "$N_d$", "$V_d$" and "material" for each of the lens surfaces are listed in accordance with the convention explained above in connection with Table I. The diameter of each lens element is one inch, and the aperture stop for the system is located at surface No. 1.

The Cargille liquid listed in Table V is identified by the code designation "470380", which uniquely specifies the particular liquid in terms of its index of refraction at the wavelength of the sodium D line. However, the values for refractive index listed in Table V for the Cargille 470380 liquid as well as for acrylic are the values at the wavelength of the sodium d line.

The values of refractive index for the optical materials comprising the lens triplet of FIG. 11 at the same five wavelengths used to evaluate the performance of the lens triplets of FIGS. 1 and 6 are as follows:

TABLE VI

| Material | Index of Refraction | | | | |
|---|---|---|---|---|---|
| | $N_1$ | $N_2$ | $N_3$ | $N_4$ | $N_5$ |
| acrylic | 1.49176 | 1.49776 | 1.48920 | 1.49826 | 1.48778 |
| 470380 | 1.47011 | 1.47877 | 1.46643 | 1.47949 | 1.46440 | where $N_1$ is the refractive index at the base wavelength of 0.58756 micron, and $N_2$, $N_3$, $N_4$ and $N_5$ are the refractive indices at 0.48613 micron, 0.65627 micron, 0.48000 micron and 0.70652 micron, respectively.

In FIG. 12, plots of transverse ray aberration versus aperture height are given for the five wavelengths indicated in Table VI. However, over the wavelength range from 0.48 micron to 0.70 micron, the separation between the curves for transverse ray aberration versus aperture height for discrete wavelengths is so small that the curves can barely be distinguished from one another in the scale of FIG. 11. From the shape of the curve in FIG. 12 representing the plots of transverse ray aberration versus aperture height for the five discrete wavelengths, it is apparent that performance of the lens triplet of FIG. 11 is limited only by third-order spherical aberration.

FIG. 13 is a plot of change in back focal distance versus wavelength for the lens triplet of FIG. 11. As indicated by the three crossings of the horizontal axis by the curve shown in FIG. 13, the lens triplet of FIG. 11 is apochromatic and has practically insignificant secondary and higher-order chromatic aberration throughout the wavelength range from 0.46 micron to 0.80 micron.

In FIG. 14, paraxial marginal ray height and rms spot radius are plotted as functions of wavelength at the image plane for the apochromatic lens triplet of FIG. 11. The curve in FIG. 14 for paraxial marginal ray height versus wavelength, which has the same shape as the curve in FIG. 13 for change in back focal distance versus wavelength, indicates that geometrical blur for the lens triplet of FIG. 11 is practically insignificant over the entire visible spectrum.

The curve for rms spot radius versus wavelength in FIG. 14 indicates that the rms spot radius for the lens triplet of FIG. 11 is substantially constant over the wavelength range from 0.42 micron to 0.80 micron. In other words, the variation of rms spot radius with respect to wavelength is practically zero in the range from 0.42 micron to 0.80 micron. The rms spot radius is approximately twice the radius of the Airy disc for the lens triplet of FIG. 11 at the 0.46 micron wavelength, and is substantially equal to the radius of the Airy disc at the 0.80 micron wavelength. Thus, the lens triplet of FIG. 11 is diffraction-limited at wavelengths of 0.80 micron and longer.

In FIG. 15, the solid-line curve is a plot of the polychromatic modulation transfer function for on-axis rays calculated at the five wavelengths listed in Table VI for the lens system of FIG. 11. The broken-line curve in FIG. 15 is a plot of the polychromatic modulation transfer function for on-axis rays calculated at the same five wavelengths for an aberration-free optical system having the same aperture diameter and focal ratio.

The present invention has been described above in terms of particular embodiments. However, other embodiments within the scope of the present invention would become apparent to practitioners skilled in the art of optical design upon perusal of the foregoing specification and accompanying drawing. Accordingly, the present invention is defined more generally by the following claims and their equivalents.

I claim:

1. A lens system comprising two plastic lens elements and a liquid lens element disposed coaxially along an optic axis, said two plastic lens elements being substantially identical to each other, said two plastic lens elements and said liquid lens element coacting with each other to provide a common back focal distance for said lens system at at least three discrete wavelengths.

2. A lens system comprising two plastic lens elements and a liquid lens element disposed coaxially along an optic axis, said two plastic lens elements being substantially identical to each other, said two plastic lens elements and said liquid lens element coacting with each other to focus optical radiation at three discrete wavelengths passing through said lens system onto a common focal surface.

3. A lens system comprising two plastic lens elements and a liquid lens element disposed coaxially along an optic axis, said two plastic lens elements being substantially identical to each other, said two plastic lens elements and said liquid lens element coacting with each other to focus optical radiation at two discrete wavelengths passing through said lens system onto a common focal surface with a change in focus of less than one-quarter wavelength over a range of wavelengths between said two discrete wavelengths, said two discrete wavelengths at which said optical radiation is focussed onto said focal surface having a spectral separation of at least about 0.07 micron.

4. The lens system of claim 3 wherein said two plastic lens elements are made of acrylic.

5. The lens system of claim 4 wherein said liquid lens element is made of an optical liquid having an index of refraction of approximately 1.71035 at a wavelength of 0.58756 micron and an Abbe number of approximately 20.95.

6. The lens system of claim 4 wherein said liquid lens element is made of an optical liquid having an index of refraction of approximately 1.50012 at a wavelength of 0.58756 micron and an Abbe number of approximately 35.31.

7. The lens system of claim 4 wherein said liquid lens element is made of an optical liquid having an index of refraction of approximately 1.47011 at a wavelength of 0.58756 micron and an Abbe member of approximately 38,08.

8. The lens system of claim 3 wherein said plastic lens elements and said liquid lens element are configured and positioned along said optic axis substantially according to an optical prescription as follows:

| Surface No. | Radius (inches) | Thickness (inches) | $N_d$ | $V_d$ | Material |
|---|---|---|---|---|---|
| 1 | 8.36182 | 0.07106 | 1.49176 | 57.46 | acrylic |
| 2 | −25.11101 | 0.00142 | 1.71035 | 20.95 | 710209 |
| 3 | 25.11101 | 0.07106 | 1.49176 | 57.46 | acrylic |
| 4 | −8.36182 | 9.92095 | | | |
| 5 | (image plane) | | | | |

9. The lens system of claim 3 wherein said plastic lens elements and said liquid lens element are configured and positioned along said optic axis substantially according to an optical prescription as follows:

| Surface No. | Radius (inches) | Thickness (inches) | $N_d$ | $V_d$ | Material |
|---|---|---|---|---|---|
| 1 | 9.55933 | 0.07106 | 1.49176 | 57.46 | acrylic |
| 2 | −6.31572 | 0.00142 | 1.50012 | 35.31 | 499352 |
| 3 | 6.31572 | 0.07106 | 1.49176 | 57.46 | acrylic |
| 4 | −9.55933 | 9.92323 | | | |
| 5 | (image plane) | | | | |

10. The lens system of claim 3 wherein said plastic lens elements and said liquid lens element are configured and positioned along said optic axis substantially according to an optical prescription as follows:

| Surface No. | Radius (inches) | Thickness (inches) | $N_d$ | $V_d$ | Material |
|---|---|---|---|---|---|
| 1 | 10.78748 | 0.07106 | 1.49176 | 57.46 | acrylic |
| 2 | −4.77688 | 0.00142 | 1.47011 | 38.08 | 470380 |
| 3 | 4.77688 | 0.07106 | 1.49176 | 57.46 | acrylic |
| 4 | −10.78748 | 9.92072 | | | |
| 5 | (image plane) | | | | |

* * * * *